United States Patent
Hansson

(10) Patent No.: US 9,779,323 B2
(45) Date of Patent: Oct. 3, 2017

(54) PAPER SHEET OR PRESENTATION BOARD SUCH AS WHITE BOARD WITH MARKERS FOR ASSISTING PROCESSING BY DIGITAL CAMERAS

(71) Applicant: WHITELINES AB, Stockholm (SE)

(72) Inventor: Olof Hansson, Nacka (SE)

(73) Assignee: Whitelines AB, Stockholm (SE)

( * ) Notice: Subject to any disclaimer, the term of this patent is extended or adjusted under 35 U.S.C. 154(b) by 191 days.

(21) Appl. No.: 14/407,796

(22) PCT Filed: Jun. 11, 2013

(86) PCT No.: PCT/SE2013/050664
§ 371 (c)(1),
(2) Date: Dec. 12, 2014

(87) PCT Pub. No.: WO2013/187832
PCT Pub. Date: Dec. 19, 2013

(65) Prior Publication Data
US 2016/0026892 A1     Jan. 28, 2016

(51) Int. Cl.
*G06K 9/46*     (2006.01)
*H04N 1/00*     (2006.01)
(Continued)

(52) U.S. Cl.
CPC ............ *G06K 9/4652* (2013.01); *G01B 11/28* (2013.01); *G06K 9/18* (2013.01); *G06T 7/11* (2017.01); *G06T 7/194* (2017.01); *G06T 7/90* (2017.01); *H04N 1/0075* (2013.01); *H04N 1/00307* (2013.01); *H04N 1/00358* (2013.01); *H04N 1/00374* (2013.01); *H04N 1/00724* (2013.01); *H04N 1/00737* (2013.01); *H04N 1/00779* (2013.01); *H04N 1/00782* (2013.01); *H04N 1/00801* (2013.01); *H04N 1/00806* (2013.01); *H04N 1/00811* (2013.01); *H04N 1/00968* (2013.01); *H04N 1/19594* (2013.01);
(Continued)

(58) Field of Classification Search
None
See application file for complete search history.

(56) References Cited

U.S. PATENT DOCUMENTS 5,493,424 A    2/1996    Tomita et al.
5,640,647 A    6/1997    Hube
(Continued)

FOREIGN PATENT DOCUMENTS

| | | |
|---|---|---|
| EP | 1696658 A1 | 8/2006 |
| EP | 1868820 B1 | 9/2013 |
| JP | 2008053926 A | 3/2008 |

OTHER PUBLICATIONS

Abstract—JPH06121146 (A)—Apr. 28, 1994.

*Primary Examiner* — Bernard Krasnic
(74) *Attorney, Agent, or Firm* — Schiff Hardin LLP

(57) ABSTRACT

A surface object comprises a surface with a boundary, the surface having a background color. At least one optical marker is provided on the surface for assisting of image processing for improving appearance of an image of the surface with the boundary. At least one optical marker includes at least one color which is lighter or darker than the background color and the color different $\Delta E$ between the background color and the at least one color of the optical marker being between $\Delta E=2$ and $\Delta E=18$.

3 Claims, 3 Drawing Sheets

(51) Int. Cl.
*H04N 1/195* (2006.01)
*H04N 1/21* (2006.01)
*H04N 1/32* (2006.01)
*G01B 11/28* (2006.01)
*G06K 9/18* (2006.01)
*H04N 5/44* (2011.01)
*G06T 7/11* (2017.01)
*G06T 7/90* (2017.01)
*G06T 7/194* (2017.01)
*H04N 101/00* (2006.01)

(52) U.S. Cl.
CPC ....... *H04N 1/2112* (2013.01); *H04N 1/32133* (2013.01); *H04N 5/44* (2013.01); *G06T 2207/30176* (2013.01); *H04N 2101/00* (2013.01); *H04N 2201/0084* (2013.01); *H04N 2201/0096* (2013.01); *H04N 2201/0438* (2013.01); *H04N 2201/3242* (2013.01); *H04N 2201/3243* (2013.01); *H04N 2201/3274* (2013.01)

(56) References Cited

U.S. PATENT DOCUMENTS

| | | |
|---|---|---|
| 6,952,285 B1 | 10/2005 | Naka |
| 2001/0038383 A1 | 11/2001 | Ericson et al. |
| 2004/0100508 A1 | 5/2004 | Hansson |
| 2005/0195447 A1 | 9/2005 | Os |
| 2005/0213174 A1* | 9/2005 | Maki .................. H04N 1/00143 358/540 |
| 2006/0209326 A1 | 9/2006 | Higashiura |
| 2008/0185834 A1 | 8/2008 | Hansson |
| 2012/0020562 A1* | 1/2012 | Vojak .................. G06K 9/2063 382/182 |

* cited by examiner

PAPER SHEET OR PRESENTATION BOARD SUCH AS WHITE BOARD WITH MARKERS FOR ASSISTING PROCESSING BY DIGITAL CAMERAS

CROSS REFERENCE TO RELATED APPLICATIONS

The present application is a §371 National Stage Application of PCT/SE 2013/050664 filed on Jun. 11, 2013, which claims convention priority to Swedish applications 1350436-0, filed on Apr. 8, 2013 and 1250639-0, filed on Jun. 15, 2012.

BACKGROUND

The present disclosure relates to a sheet of paper, and application programs.

The use of small devices such as mobile phones comprising processors is growing rapidly. Despite this development, paper is still widely used for making notes and will be for the foreseeable future. It has been possible for a long time to scan paper documents to store their contents in data files.

Most scanners for documents are fairly large and therefore stationary. On the other hand they provide relatively unified images of sheets of paper, since the distance from the imaging unit, the orientation of the paper while scanning, and the light conditions can be controlled to a large extent.

More and more small electronic devices, such as mobile telephones, comprise digital camera units, and the quality of these camera units is steadily improving, so that for example mobile telephones today are effectively digital cameras.

An application program, or app, enabling the editing of photos of paper sheets taken by means of the camera of a mobile phone was recently launched by the Japanese company Kokuyo. This app is arranged to enable a user to capture an image of a sheet of paper. Markers in the corners of the sheet are used to determine the sheet's orientation and adjust it within the image. Other markers can be provided to indicate a folder in which the sheet should be stored. Further, the user can provide markers by coloring predefined areas in the corners of the sheet.

Using markers only in the corners of the sheets limits the types of corrections that may be performed on the image, and their accuracy. For example, a fold or a crease in the center of the sheet may not be detected at all, or its correction may be impossible to determine correctly. It may also be that portions of the text having a very low contrast to the background may be lost in the imaging, without the user being able to tell from the resulting image that something is missing.

SUMMARY

It is therefore an object to enable more extensive and more correct processing of the quality of an image of a surface object comprising a surface with a boundary such as a sheet of paper, a screen, a projected image on a screen or on a wall, a markerboard, a presentation board, or the like.

A surface object comprises a surface with a boundary, the surface having a background color. At least one optical marker is provided on the surface for assisting of image processing for improving appearance of an image of the surface with the surrounding boundary. At least one optical marker includes at least one color which is lighter or darker than the background color and the color different $\Delta E$ between the background color and the at least one color of the optical marker being between $\Delta E=2$ and $\Delta E=18$.

EXEMPLARY EMBODIMENTS

Figure 1A:
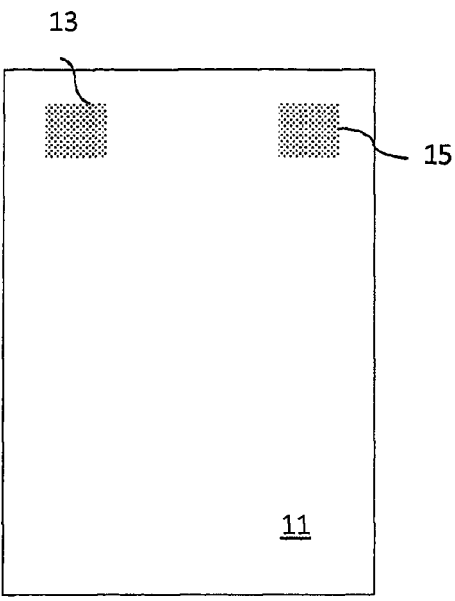
FIGS. 1*a*, 1*b*, and 1*c* are examples of sheets of paper with markers according to embodiments of the present invention.

For the purposes of promoting an understanding of the principles of the invention, reference will now be made to the preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included herein.

A surface object comprising a surface with a boundary, such as a sheet of paper, has at least one optical marker provided on it, for assisting in image processing for improving the appearance of an image of the sheet of paper, characterized in that it has a color difference $\Delta E$ between the sheet of paper and the optical marker that is between $\Delta E=2$ and $\Delta E=18$. The surface object may also be a presentation board or markerboard such as a whiteboard is provided having at least one optical marker provided on it in the same way and for the same purposes. In this document the term surface object comprising a surface with a surrounding boundary will be used to mean a sheet of paper of any size, a screen having an image comprising optical markers in the same way, a projected image on a screen or a wall, a markerboard, a presentation board, or the like.

To facilitate the identification the optical marker or markers are preferably placed on the sheet in a non-repetitive way. The optical markers may be integrated with the sheet, markerboard etc., or may be supplied separately as markers suitable for being attached to the sheet or board in question. In the former case the markers may be printed on the sheet or board, or provided in any other suitable way. In the latter case labels may be provided with the marker pattern on them which may be placed on the sheet or board by a user before imaging. The labels are preferably arranged to be attached to the sheet or board. In one embodiment they are arranged to be permanently attached, for example using a permanent adhesive on the back of the labels. The labels may also be adapted to be detachably attached to the sheet or board, for example by the use of a weak adhesive allowing them to be removed and used again with a different sheet. In the case of markerboards, the labels may be magnetic to allow them to be detachably attached to the board. In all of these cases the labels may be supplied separately and used with any paper sheet or markerboard. As will be understood, the markers may be designed in any suitable way, as is discussed below in connection with FIGS. 1a-1c.

In addition to assisting image processing there may be optical markers arranged to provide information about the type of paper sheet, possibly assisted by a user-made mark. For example, the optical markers may be arranged to provide information about a location in which to store the image, possibly assisted by a user-made mark.

The sheet may further comprise a pattern such as lines or squares for assisting writing or drawing on the sheet, said pattern having a higher degree of white than the background of the sheet. A paper sheet may have any size that may be imaged, ranging from small stickers of A7 format or smaller, to large sheets including flip chart sheets, or larger. A screen, markerboard or projected image may also have any size.

The color difference ΔE between the sheet background color and the optical marker is preferably between 3 and 10. In particular, values of ΔE between 5 and 8 have been found to provide a suitable compromise between the need for a good contrast and the desire to keep the background relatively bright.

The coded information present on the sheets of paper enable a number of processing functions that will enable a more user-friendly presentation of the scanned or photographed images of the papers.

In a preferred embodiment the sheet has a background color different from white point, and the optical markers have a higher degree of white than the background of the sheet. This means that the optically readable code areas, or markers, are brighter than the background shade of the sheet. In this case the coded areas will not interfere with any notes, etc. added manually to the sheet, since such notes will be in a shade that is darker than the background shade of the sheet. Many scanners and copiers have functions for adjusting the background color of the sheets to white in the images. Most digital cameras today also provide functions for adjusting the background color. Any markings on the sheet that are brighter than the background will then become invisible, leaving only the information added to the sheet. Therefore, the notes made by the user will stand out more clearly, since they will be darker than the background. As a result, the image taken will be an image of the notes or information on the sheet rather than an image of the sheet.

Therefore, in this embodiment code areas or markers can be provided in any location of the sheet, as reference points to enable more precise calculations, unlike conventional dark coded areas, which would render notes illegible. Hence in the prior art only a small part of the sheet can be used for code markers, namely the parts in which notes are not likely to be made, typically the margins.

As explained above, the word sheet in this document may mean any one of the following:

A paper sheet of any size

A computer screen, television screen, or the like

A markerboard, such as a whiteboard

In contrast, with an exemplary embodiment, image processing may be used to make the coded areas invisible in the image. The coded areas can be used both for adjusting the orientation of the image, for compensating for folded or bent parts of the image and for compensating for the sheet not being at a straight angle with the optical axis of the camera. It would also be possible to use lines or squares provided as writing support, as complementary markers to provide information about the whole sheet. Using only lines or squares would not be feasible in the context of the exemplary embodiment, since a certain asymmetry is required to determine the correct orientation of the sheet.

Also, since the notes are normally darker than the grey background, the use of white markers will help ensure a high quality in the imaged sheet, in the cases where the application program is arranged to check the contrast between the white markers and the grey background before taking a picture. Adding to this effect is the fact that the contrast between the grey background and the white markers is normally lower than the contrast between the grey background and the added content. This is because in the cases when the contrast between white and grey is deemed good enough to take a picture, the contrast between the grey background and the darker content will be good.

In particular, the pattern of coded markers may provide information for determining the size and the orientation of the sheet. This is particularly important when the sheet is a paper sheet but is also relevant for other types of media. It may also provide information for determining the brightness of the sheet in different areas of the sheet and to adjust for any variation in brightness across the sheet. The complementary marker pattern of lines or squares may also be used for determining the brightness, together with the coded markers or on their own.

Further the pattern of coded markers may provide information about the type of blank paper used, such as the format (A4, A5, letter) and whether the paper is lined, squared, and/or provided with margins or other patterns to help structure the hand-written notes on the sheet.

The pattern of coded markers may also be designed to indicate that a sheet of paper, a markerboard etc. belongs to a particular company, organization, or project. This may assist indexing of the imaged papers, for example to ensure that they are stored in a particular file catalog belonging to this company, organization or project. Based on its location in the storage system, an electronically stored image of a sheet, from which the markers have been removed, can be automatically provided with new markers in an electronic version, or in print. Also, the format can be changed, for example to make all sheets in a collection of notes the same size. It would also be possible to provide a number of spots that are brighter than the background, to allow a user to indicate a particular folder or the like, in which the imaged sheet should be stored, depending on, for example, the project, department etc. that the information on the sheet belongs to. The user could then place a dark marker inside the bright spot corresponding to the folder in which the image should be stored. For example the user may color the whole spot, or just tick it. This darker mark provided by the user in the pre-provided spot could be easily detected and interpreted by the imaging program. The spots may also be used as markers, but not necessarily.

In this document, the notes provided on the sheet should not be interpreted as meaning only hand-written text. It may be any pattern added to the sheet. It may be provided by hand, such as text, sketches, shorthand or any combination of such patterns. Alternatively, or in addition, it may be stamped, printed, typed etc. on the sheet.

In particular, modified versions of the notepaper provided by Whitelines®, as described in EP1868820, are well suited for this application. It has been shown that the brighter lines provided on these sheets are less distracting to a user making notes on the paper. Also, since the lines can be made to disappear in the scanned image, they enable storing sheets digitally with only the intended information. This facilitates digital processing including modification, deletion and addition to the notes in the image.

The exemplary embodiment also relates to an imaging program for use in a small electronic device comprising a digital camera unit, a processor unit and a memory unit, which, said program comprising computer readable code means which, when executed in the processor unit, will make the digital camera unit perform the following steps:

Analyze an image registered by a camera objective,

Identify the presence in the image of a predefined sheet, having on it at least one coded information mark When the image fulfils certain conditions, capture a still image by means of the camera and storing it in the memory unit, preferably without user intervention.

The sheet may be a paper sheet of any size, a markerboard such as a whiteboard or a television screen or computer screen, or a projected image on a screen or a wall.

This imaging program, typically but not necessarily in the form of an app, may be used for imaging and processing a sheet as defined above. Preferably, the program is arranged for detecting the at least one marker in the form of at least one brighter marker on a slightly darker background, as specified above. To enhance the quality of the image it is preferable to detect more than one marker. To determine the position of the sheet in 3D space at least four markers would be preferable.

In a preferred embodiment the analyzing step is performed on an image from a recorded video stream.

The conditions typically comprise one or more of the following:

The imaging unit determines that the imaged object is a sheet.

The imaging unit is able to identify a certain number of coded information marks on the imaged sheet.

The image contrast between the coded information mark and the background exceeds the threshold value for a predefined number of coded information marks.

The application program is preferably further arranged to make the digital camera unit transmit the image file to a remote storage unit automatically, without any user instruction. In this case it may be arranged to make the digital camera unit transmit the image file to a particular location in the remote storage unit in dependence of information retrieved from the sheet, for example from the optical markers.

With the application program according to the preferred embodiment, the image may be captured automatically when the quality is good enough. This means that there does not have to be any user intervention when the image is captured. Such user intervention normally affects the stability of the camera device, leading to a somewhat blurred image. Hence, the imaging method of the exemplary embodiment will improve the image quality, making it more suitable for imaging color areas of low contrast, since there is no physical intervention when the image is captured.

Aspects of the exemplary embodiment also relate to an image processing program for use in a processing device comprising, a memory unit and a processing unit, arranged to process images taken using the imaging program above. This image processing program comprises computer-readable code means which when run in the processing device will cause the processing device to process an image according to the following:

detect position and/or size of at least one optical marker on the sheet perform image correction based on the detected position or size, said image correction comprising at least one of the following adjusting the size of the sheet in the image correcting the orientation of the sheet in the image in a plane substantially perpendicular to the camera's optical axis, adjusting the background color of sheet, compensating for folds and/or bent portions of the sheet, compensating for the sheet being tilted relative to the camera's optical axis, acting on any content added to the sheet.

The step of acting on any content added to the sheet typically comprises detecting a mark added by a user in a pre-defined area of the sheet, interpreting the shape and/or position of the mark and treating the image in dependence of the mark, for example, by sending it to a particular location for storage.

This image processing program, typically but not necessarily in the form of an app, may be used for adjusting the image according to one or more of the following:

to align and straighten out the sheet in the image and/or to make the sheet fill substantially the whole image, to provide an even background, to remove any markers from the image making only the added information visible in the image, to determine if the sheet should be stored in any particular location.

The pattern of coded markers on the sheet may also comprise a version indicator, indicating a version of the paper, corresponding to a particular version of the imaging program, the image processing program, or both. If there is a mismatch between the version indicated by the version indicator on the paper and the version of the relevant program, this may be used as an indicator to the program. Typically, if the paper sheet has a newer version than the program, this may be used as a trigger for the device comprising the program to update to the appropriate version of the program. If the paper sheet has an older version than the program this may indicate to the program that not all functions in the program may be used with this particular sheet.

If a combination of markers that are brighter than the background and markers that are darker than the background are used, the imaging program or the image processing program, or both, may be arranged to differentiate between brighter and darker marker, which may then be used for different functions. For example, the brighter markers may be used for alignment and the darker markers may be used for information about where to store the paper.

The exemplary embodiment also relates to an imaging device comprising an imaging unit, a processing unit and communication means for communicating with a computer, said imaging device comprising an application program according to a digital camera device comprising an imaging program and/or an image processing program as described above.

The imaging device may be used in any type of digital device having a camera, such as a terminal for mobile telephony, or a small computer such as a laptop, a notebook or a computer tablet. Of course, the image processing program may also be used in a digital device having no camera, if the image files are transferred to such a digital device.

FIG. 1a illustrates a first example of a surface object comprising a surface with a surrounding boundary comprising for example a sheet of paper 11 with square markers 13 and 15 according to an exemplary embodiment of the invention. The markers 13, 15 are slightly darker than the background, which is white or near white. This is indicated as a shading of the markers. As can be seen, in this example there is one marker near each of the upper two corners of the sheet. Of course, all or some of the markers could be circular, triangular, or cloud shaped, or have any other regular or irregular shape instead. Different shapes could be used, for example, to indicate the different positions on the sheet to facilitate image analysis. Different shapes could also be used to indicate the type of paper, or the intended use of the paper.

Figure 1B:
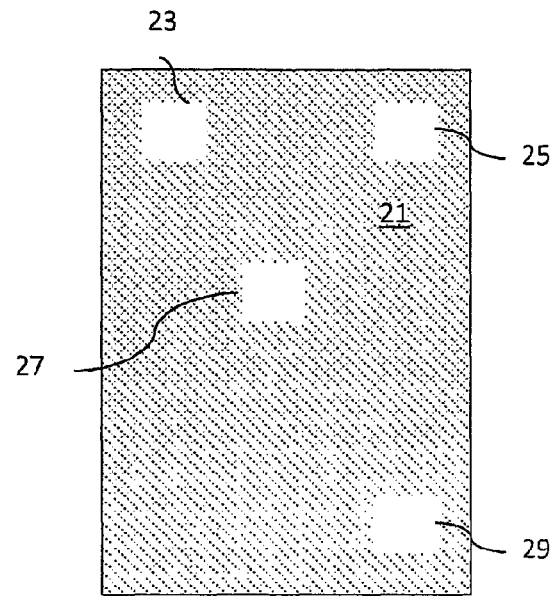

FIG. 1b illustrates a similar example of a paper sheet 21 as FIG. 1a, but instead of markers that are slightly darker than the background, the background is lightly colored, for example in grey, as indicated by the shading, and the markers 23, 25, 27, 29 are white or near white. Hence, the markers have a lighter color than the background.

Figure 1C:
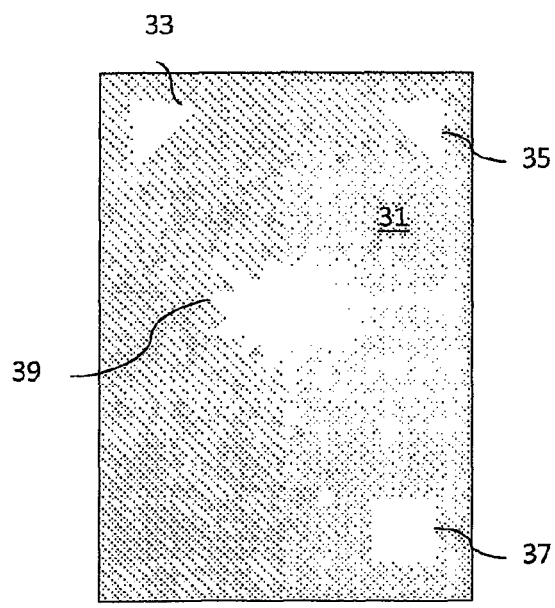

FIG. 1c illustrates a second example of a sheet of paper 31 with white or near white markers on a slightly darker background, according to an embodiment of the invention. As can be seen, the markers in this example include a first and a second triangular marker 33, 35 in the upper corners, a square marker 37 in the lower right corner. In the center of the sheet there is a further marker 39, which has an irregular shape.

Figure 1D:
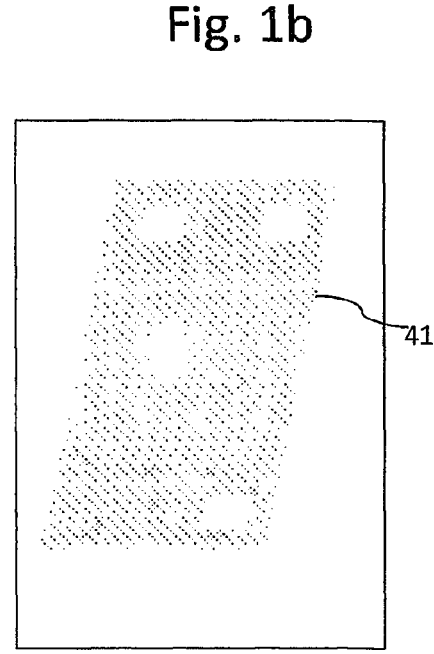
FIG. 1*d* is an example of an imaged sheet.

FIG. 1d illustrates a captured image of a sheet of paper, a markerboard, a screen or a projected image. As can be seen, the image includes the whole sheet 41 with markers, and the area surrounding the sheet. The sheet of paper will take up a portion of the image depending on the actual size of the sheet and the distance to the camera, which cannot be known or controlled exactly. According to exemplary embodiments of the invention this may be compensated for, as will be discussed below.

As indicated above, the pattern in FIGS. 1b, 1c, 1d may also be provided on a whiteboard. The pattern may also be provided on a television screen, a computer screen or the like, or in a projected image on a wall or a screen or the like. In all of these cases the pattern can be imaged in the same way and the image may be processed in the same way independently of the medium on which the pattern is presented.

In the embodiments shown in the FIGS. 1b and 1c, the markers are provided as brighter fields on slightly colored paper. The background color has to be fairly light, but could have any color, that is, not necessarily grey. A degree of color difference between the markers and the background is generally defined as delta E in (CIE)-LAB space. A value $\Delta E$ in the interval 6-7, has been found to be suitable. Preferably the background should be just dark enough that the brighter markers can be detected both by a human eye and by the respective programs that may be used with the paper. The markers should be white or near white. As mentioned above, the color difference is preferably between 2 and 18, even more preferably between 3 and 10.

Paper having support lines or squares in a brighter shade than the background to assist writing is provided today under the trademark Whitelines®. Such paper has turned out to have a number of advantages over traditional paper with darker lines or squares, and using brighter markers for aligning and adjusting paper also has a number of advantages. In particular, it will be possible to eliminate the markers from the imaged sheet so that the imaged sheet only has dark content on a light background. Still, it would be possible to use markers that were darker than the background, too, and a combination of lighter and darker markers.

A pattern of markers may vary in the number of markers used, the distribution of the markers on the sheet, and/or the shape of the markers. The number of markers and their distribution are preferably selected in such a way that they enable the application program according to the exemplary embodiment to determine an appropriate position, format and scale of the sheet, and to adjust them in the image, and to correct in the image substantially any fold or crease on the sheet. The shape of the markers may be any suitable shape, which may be regular or irregular.

The number of markers, their shape and their distribution may all be used to identify a particular type of paper. For example, paper format A4 may have a different pattern from A5, and lined paper may have a different pattern from squared or blank paper. The number, shape and distribution of markers may also be used to identify a user, or a particular use of the paper. A special combination of geometric shape and distribution could be used to signify that the paper belongs to a particular organization or company, or to a particular project. A simple way of achieving this would be to add a particular marker in terms of shape and position to a standard pattern already used for a particular type of sheet. This combination could then be used by the application program to sort the images into folders as will be discussed below.

The markers may also be used to indicate a version of the paper, or a desired version of one of the programs provided for imaging the paper and for processing the imaged paper. This version indication may be used to trigger an automatic update of one of the programs, if a newer version is available. It may also be used to indicate to the respective program which functions are available for a particular sheet of paper, depending on the markers provided on that sheet.

Figure 2:
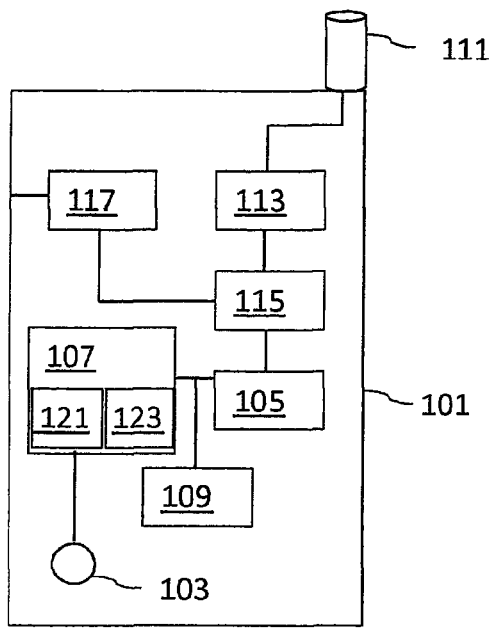
FIG. 2 is an electronic device according to an embodiment of the invention.

FIG. 2 illustrates an embodiment of an electronic device 101 according to the exemplary embodiment. The electronic device in this embodiment is a mobile telephone having a camera 103. The device 101 also includes an image processor 105 and a program memory 107 connected to the processor 105 holding functionality for handling the camera functions, and possibly other functions of the device. An image memory 109 is preferably arranged for holding captured images. Alternatively, images may be transferred directly to a storage unit in another device.

The program memory holds a first program 121 for the initial processing of images from the video stream and a second program 123 for the more advanced processing of the captured still images. The functions of these programs will be discussed in more detail in connection with FIGS. 3 and 4, respectively. In this embodiment both programs may be run in the image processor 105. As will become clear from the following description, it may be feasible instead to have a first image processor for the initial processing of images from the video stream and a second image processor for the captured still images.

The telephone 101 shown in FIG. 2 is a standard mobile telephone, well known to the skilled person, and its functions will therefore only be described very briefly. The telephone 101 also comprises communication units, such as an antenna 111 and a signal processing unit 113 arranged to process signals incoming and outgoing through the antenna 111. A user input/output unit 115 is connected to the signal processor 113 and to the image processor 105. The user input/output unit 115 normally comprises several input/output functions, such as a screen, which may be a touchscreen, a keyboard and/or a keypad, and possibly other input/output functions, such as voice control functions. These are all known in the art and will not be described in detail.

As is common in the art, the telephone 101 also has one or more other communications units 117, for communication through IR, Bluetooth or any other way of communication. Such communications units are all known in the art and will not be described in detail. Of course these communications units may be used for transferring image files obtained by the camera according to the exemplary embodiment to another device. Such transfer may be automatic or initiated by the user.

In FIG. 2 the device is a mobile telephone including a camera; however, according to the exemplary embodiment any type of electronic device including a camera could be used. For example, the device could be a personal digital assistant, a computer such as a laptop, or a mini computer, a reading pad, a computer tablet or similar.

When imaging a sheet by means of a handheld camera the quality may be impaired in many different ways.

The whole sheet may be turned or tilted with respect to the camera

The sheet may be bent, folded or creased causing some areas to appear farther away from the camera than others Bends or folds may also cause some areas of the sheet to appear darker or lighter than the rest The distance between the camera and the sheet may vary so that the image captures some of the surroundings of the sheet, or a little less than the whole sheet.

The camera 103 itself may be a standard camera as provided in many mobile telephones and other electronic devices. Some of the functions 107 for handling the images, on the other hand, are specific to the invention. The functions include:

selecting and analyzing images from a video stream to determine if a photo with a satisfactory quality can be taken, detecting markers on a sheet of paper, a markerboard, a screen or a projected image as will be discussed in connection with FIG. 3.

The various types of adjustment will be discussed in connection with FIG. 4.

The camera functions 107 include an image capturing application program 121 for controlling the imaging function of the camera. The image capturing application program is preferably arranged to control the imaging function so that an image is captured only when the conditions are good enough. When the conditions are deemed to be good enough, the image capturing application program may be arranged to perform the imaging automatically. The conditions may be more or less strict, ranging from the detection of a sheet, screen or image having markers on it, to stricter conditions for the number of markers that can be detected or the detected contrast between the markers and the background.

In this case the device records an image stream and the image capturing application program 121 has functions for determining the image quality of an image in the video stream registered by the camera, and controlling the camera to capture a still image if the quality is deemed to be high enough. These functions are illustrated by the flow chart of FIG. 3. It may be suitable to include other image handling functions as well, such as anti-shake functions to improve images taken with a camera that is not entirely still.

Alternatively the image capturing program may be arranged to signal to the user that the conditions are good, and take the picture only after user instructions. The user may also be allowed to force a picture even if the camera determines that the conditions are not good enough.

An application program 123 for image processing of the still image may be provided in the electronic device 101 arranged to capture the images. A similar application program may also be provided in another processing unit, such as a computer, for processing images captured by a device and transferred to the other processing unit. This application program comprises functions for processing the information about the detected markers, including one or more of the following functions:

adjust the orientation of the imaged sheet so that the corners of the sheet will be found in or near the corners of the image.

adjust the size of the sheet in the image to compensate for variable distance between the camera and the paper sheet Preferably the size of the sheet is adjusted so that it fills substantially the entire stored image. This involves discarding information from outside the paper sheet.

align the sheet in the stored image. This involves processing the image to show the sheet as if the sheet had been substantially flat even though it may be bent or folded. It also involves compensating for the case where the sheet is tilted with respect to the optical axis of the camera lens.

Each of these functions will be discussed in more detail in connection with FIG. 4 below.

Figure 3:
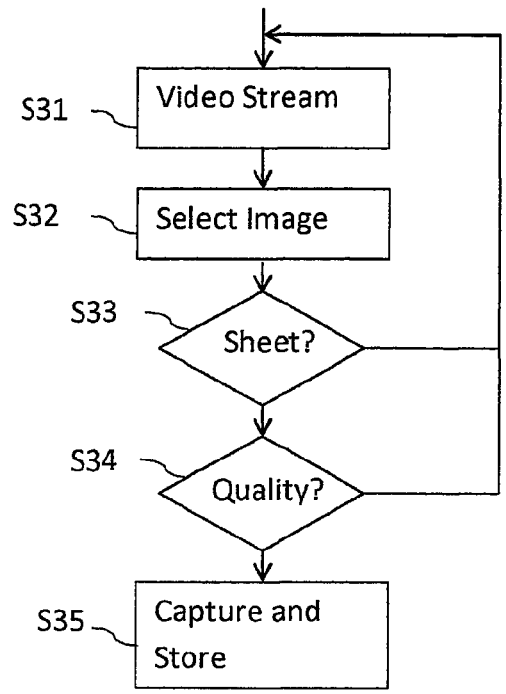
FIG. 3 is a flow chart of the functions performed by the image capturing application program according to an embodiment of the invention.

FIG. 3 is a flow chart of the functions performed by the image capturing application program according to a preferred embodiment of the invention.

In step S31 the device's camera 103 records a video stream of the object to be imaged. This recording is preferably initiated by the user of the device having the camera.

In step S32 the image capturing function 121 is used to analyze one image from the video stream and determine if the object is a sheet according to the exemplary embodiment, that is, a paper sheet, board, screen or projection having coded information marks. The image will look essentially as shown in FIG. 1d. If yes, go to next step; if no, the procedure returns to step S31.

In step S33, the image capturing function determines if the image selected from the video stream is found to comprise a sheet. If yes, go to next step; if no, the procedure returns to step S31.

In step S34 it is checked if the image fulfils certain conditions. When the functions 121 determine that the image fulfils certain conditions, the camera 103 is instructed to capture a still image and store it in the memory unit 109. The conditions may be simply that a sheet is detected, for example based on edge detection, but are preferably related to the contrast between the coded information marks and the background; that is, the image capturing application program is arranged, in Step S35, to take a still picture of the sheet only if the contrast between the markers and the background is deemed to be good enough. The check in step S34 therefore implicitly involves a quality check.

The camera then, in step S35, captures the still picture and stores it.

Figure 4:
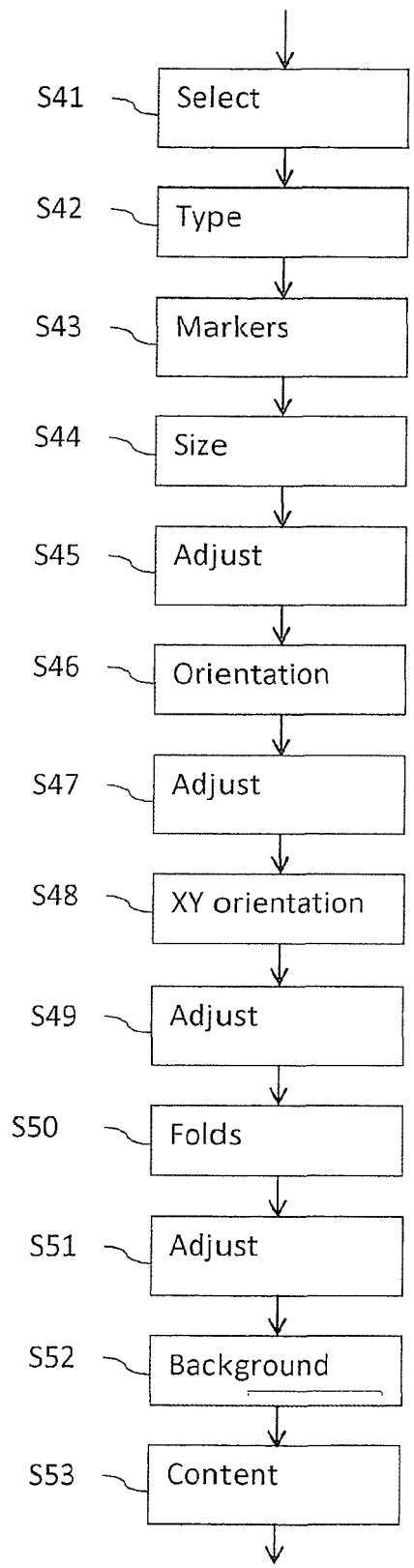
FIG. 4 is a flow chart of the functions performed by the image processing application program according to an embodiment of the invention.

If the still picture should be adjusted right away, the procedure continues with the adjustments discussed in FIG. 4, starting with step S42 or the first applicable step; if not, the procedure ends.

Instead of a video stream the camera may simply register the image and a still image be taken when the image fulfils the condition. It would also be possible for a user to make the camera take an image, for example, if the camera determines that the conditions are not fulfilled. This image could be analyzed later on, in the context of the image processing program described in connection with FIG. 4 below, to see if a meaningful processing is possible. Also, the image could be enhanced using known image processing techniques, such as thresholding, to improve the quality so much that processing is possible.

Steps S33 and S34 may be integrated in one step according to some embodiments.

Step S32 may comprise identifying a shape in the image that has a rectangular shape and looks like a sheet of paper. This can be done by edge detection, which is generally easier than recognizing the markers. Additionally, or alternatively, it may comprise identifying one or more of the markers that should be present on a sheet, which will ensure that it is the right type of sheet.

Step S33 may comprise analyzing the whole sheet or just one or more portions of the sheet, containing all or a subset of the markers. As an alternative to searching in specific portions of the sheet, the following steps may be performed:

Decrease the resolution of the image to produce a low resolution image

Identify areas in the low resolution image that seem to have markers

Perform a detailed search in the identified areas to confirm the presence of markers In step S35 the camera will capture a still image, which will generally have a much higher quality than the images in the video stream. This ensures that the captured image will have a sufficient quality, since the video stream image has already been found to satisfy some quality criteria.

In step S35 it would be possible to take a number of pictures at one time or at short intervals and select the best one afterwards. Preferably, after a page has been imaged, some form of user input is required to instruct the camera to return to step S31 to try to capture a new image. This is to prevent unwanted repeated images of the same sheet.

If the processing capacity is high enough, theoretically every image in the video stream could be analyzed in this way. In practice, however, a fraction of the images, typically every nth image, n being an integer, will normally be analyzed, typically depending on the image capturing rate and the processing capacity. For example, every 5th, or 10th, or 20th image may be analyzed.

The procedure of FIG. 3 may also include a step enabling the user to transfer the captured image file to another processing unit. This is preferably achieved using communication functions already present in the device. This may also be done automatically to a default unit, or the program may have a function for determining which unit the image should be transferred to, based on properties of the imaged sheet. The file may also be automatically sorted into a particular folder or the like in dependence of the properties of the imaged sheet. For example, the pattern of the markers on the sheet may identify it as belonging to a particular project, so that it should be automatically sorted into a folder for files belonging to that project.

FIG. 4 is a flow chart of the functions performed by the image processing application program according to an embodiment of the invention. These functions may be performed concurrently with step S35, or a previous image may be processed while the camera is performing the method of steps S31-S35 on a new sheet. Alternatively, the processing may be performed after a desired number of images have been captured. The application program has information about the different types of sheets available, and about the optical markers used for each type of sheet, that is, the number of optical markers, their sizes and shapes, and their locations on the sheet. As will be understood, most of the steps are optional, so that the image may be corrected in only some of the possible different ways. Also, the order of the correction steps S44-S53 is not important.

Step S41: select the image file to be processed.

Step S42: determine the type of sheet imaged, if the sheet contains such information Step S43: detect the presence of optical markers on the sheet.

Step S44: detect the size of the sheet in the image, that is, the portion of the image occupied by the sheet. This can be done by detecting the edges of the sheet and/or the position or size of the optical markers. For example, the relationship between the distance between two known markers in the image and on the sheet itself can be used to determine how much the imaged sheet should be magnified. The relationship between the size of a marker in the image and the known size of the marker itself can be used in a similar way, as can the relationship between the size of the marker and the size of the sheet. Also, information contained in a barcode or a QR code or the like can be used to determine the size of the sheet.

Step S45: adjust the size of the sheet in the image, based on the size detected in step S44.

Step S46: detect the angle of the sheet relative to the camera's optical axis, that is, the Z axis. This may be done by detecting the distance to markers in various parts of the sheet and relative position of markers on the sheet, and/or in dependence of the edges of the sheet.

Step S47: adjust the orientation of the sheet based on the angle detected in step S46, by tilting the imaged sheet within the image.

Step S48: detect the orientation of the sheet in the plane perpendicular to the optical axis, that is, the XY plane. This may be done by detecting the relative position of markers on the sheet, and/or in dependence of the edges of the sheet.

Step S49: adjust the orientation of the sheet based on the orientation detected in step S46, by rotating the imaged sheet within the image.

Step S50: in dependence of the optical markers, detect any folds or creases or bent portions on the sheet. This may be done in dependence on the markers positions, for example, the distances between two or more optical markers deviating from the known distance. For effective correction a number of distances or sizes should be covered, representing areas covering the whole sheet.

Step S51: adjust the imaged sheet for any folds or creases detected in step S48.

Step S52: adjust the background color of the sheet.

This may be done by a simple threshold function in which all pixels or areas that are white or light grey are corrected to white. At the same time all pixels or areas that are darker than the threshold may be kept as they are, or corrected to enhance the contrast. It would also be possible to enhance the color of each area or pixel to obtain an enhanced color image.

In step S53 an analysis of significant added content may be performed. This may be, for example, added markers in specific positions of the sheet indicating the type of sheet, or where the image should be stored. As explained above, the sheet may have one or more bright markers in which a user can place dark marks to indicate that the sheet belongs to a particular project or the like, which could be used to determine automatically a storage space for the image and to send the image to this storage space.

After this processing, the image is stored in the device and/or transmitted to another unit to be stored there.

Figure 5:
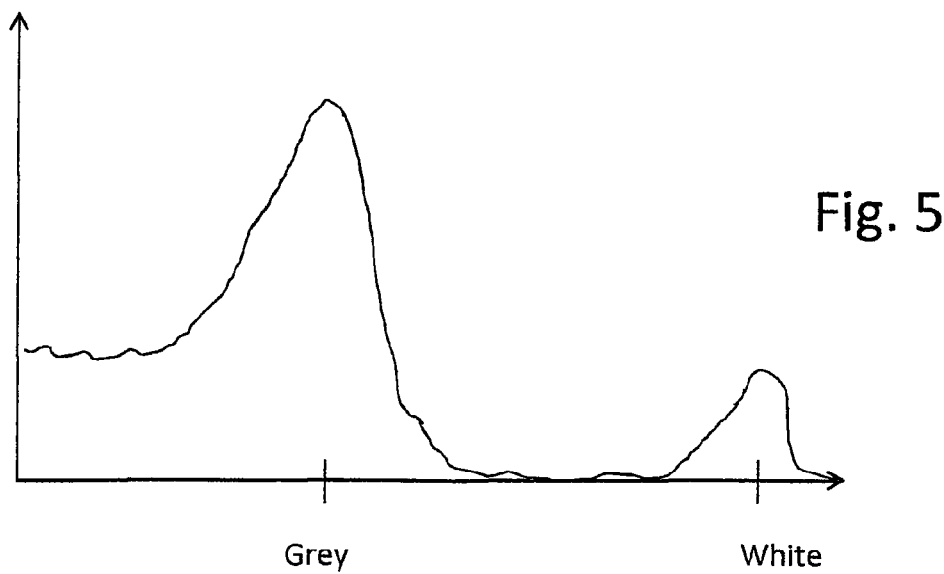
FIG. 5 is a histogram of the color distribution of an example sheet of paper.

An example of how to analyze the background color is illustrated in FIG. 5. This Figure shows an example histogram illustrating a possible distribution of color intensity, or darkness, on a sheet. The color intensity decreases along the X axis and the fraction of the sheet that has a particular color intensity is shown on the Y axis. As shown in FIG. 5 there will typically be a peak indicating the background color of the sheet. If a Whitelines® paper is used there will be a peak at a light grey color, indicated by the word grey in the image. There will also be a lower peak indicating white, indicated by the word white in the image. Between the two peaks the level will be low as normally no part of the sheet will have a shade between the background and the white. Typically there will be some areas that have darker color tones, where notes have been made on the paper.

Noise suppression methods, such as adaptive thresholding may be used to reduce noise in the image, both in the image capturing program and in the image processing program.

According to the exemplary embodiment it will also be possible to create histograms for one or more areas of the sheet. Because of different light conditions in different parts of the sheet, the background color of the sheet may vary across the image. Therefore, the position of the peak for grey color in the histogram may vary. By determining the background color separately for different areas of the sheet these differences in image background color may be compensated for.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

The invention claimed is:

1. A digital camera device comprising:
a digital camera comprising a camera objective;
a processor in communication with said digital camera;
a memory in communication with said processor;
said digital camera being configured to register, via said camera objective, an image of a pre-defined sheet of paper comprising a surface with a boundary and a non-white background, on which notes are present that are darker than said background, within said boundary, and to provide a digital representation of the registered image to said processor;
said processor being configured to perform an analysis of the registered image to determine whether the registered image contains at least one coded optical marker that is brighter in said registered image than said background, with a color difference $\Delta E$ between said background and said coded optical marker being in a range between $\Delta E=2$ and $\Delta E=18$;
said processor being configured to determine, in said analysis, whether a still image capture condition exists that will cause said notes to be legibly visible in a still image of the pre-defined sheet of paper, said still image capture condition being selected from the group consisting of a detected contrast between said at least one coded optical marker and the background exceeding a predetermined threshold value, or there being multiple occurrences of said at least one coded optical marker in said image;
said processor being configured, when said still image capture condition is determined to exist in said registered image, to emit a signal to said digital camera, and said digital camera, upon receipt of said signal, being configured to then capture, via said camera objective, said still image of said pre-defined sheet of paper in which said notes are legibly visible, and to provide a digital representation of said still image to said processor;
said processor being configured to compile a data file of said still image from said digital representation of said still image provided thereto, and to store said data file in said memory; and
said processor being configured to access said data file from said memory and to make said data file available in electronic form as an output from said processor.

2. The digital camera device of claim 1 wherein said processor is configured to interface with at least one of a mobile telephone, a small computer, a notebook, or a computer tablet in order to provide said data file thereto.

3. The digital camera device of claim 1 wherein said still image capture condition comprises said multiple occurrences of said at least one coded optical marker being present in said image in a predetermined pattern.

* * * * *